US006505130B1

(12) United States Patent
Springer, III et al.

(10) Patent No.: US 6,505,130 B1
(45) Date of Patent: Jan. 7, 2003

(54) LASER DOPPLER VIBROMETER FOR REMOTE ASSESSMENT OF STRUCTURAL COMPONENTS

(75) Inventors: Paul LeBaron Springer, III; James E. Mahaffey, both of Atlanta; Ronald Gordon Harley, Lawrenceville, all of GA (US)

(73) Assignee: Georgia Tech Research Corporation, Atlanta, GA (US)

( * ) Notice: Subject to any disclaimer, the term of this patent is extended or adjusted under 35 U.S.C. 154(b) by 0 days.

(21) Appl. No.: 09/569,176

(22) Filed: May 11, 2000

Related U.S. Application Data
(60) Provisional application No. 60/133,588, filed on May 11, 1999.

(51) Int. Cl.[7] .............................................. G01B 21/32
(52) U.S. Cl. ........................................ 702/40; 702/39
(58) Field of Search ........................ 73/579, 646, 703; 342/22; 356/5.01, 11, 376, 489; 367/13; 395/2.79; 706/26

(56) References Cited

U.S. PATENT DOCUMENTS

| | | | | |
|---|---|---|---|---|
| 4,128,011 A | * | 12/1978 | Savage | 73/579 |
| 4,294,544 A | * | 10/1981 | Altschuler et al. | 356/376 |
| 4,641,527 A | | 2/1987 | Hiroi et al. | 73/582 |
| 5,285,521 A | * | 2/1994 | Holt et al. | 395/2.79 |
| 5,327,357 A | | 7/1994 | Feinstein et al. | 364/502 |
| 5,394,233 A | * | 2/1995 | Wang | 356/5.01 |
| 5,473,759 A | | 12/1995 | Slaney et al. | 395/2.75 |
| 5,520,052 A | | 5/1996 | Pechersky | 73/579 |
| 5,521,840 A | | 5/1996 | Bednar | 364/508 |
| 5,579,232 A | | 11/1996 | Tong et al. | 364/474.17 |
| 5,737,085 A | * | 4/1998 | Zollars et al. | 356/376 |
| 5,798,981 A | * | 8/1998 | Littlejohn et al. | 367/13 |
| 5,821,425 A | * | 10/1998 | Mariani et al. | 73/703 |
| 5,886,264 A | * | 3/1999 | Hu et al. | 73/646 |
| 5,995,910 A | | 11/1999 | Discenzo | 702/56 |
| 6,105,015 A | * | 8/2000 | Nguyen et al. | 706/26 |
| 6,246,355 B1 | | 6/2001 | Miceli et al. | 342/22 |
| 6,271,924 B1 | * | 8/2001 | Ngoi et al. | 356/489 |
| 6,317,506 B1 | * | 11/2001 | Helbig et al. | 382/107 |

OTHER PUBLICATIONS

"Preliminary Review of Airborne Laser Doppler Vibrometer Techniques". Electro–Optics, Environment, and Materials Laboratory, Georgia Institute of Technology (Dec. 1999).

Pines, Darryll J. "Detection of Utility Pole Rot Damage by Measuring the Reflection Coefficient" Journal of Nondestructive Evaluation, vol. 16, No. 1, pp. 43–56 (1997).

(List continued on next page.)

Primary Examiner—John S. Hilten
Assistant Examiner—Douglas N Washburn
(74) Attorney, Agent, or Firm—Thomas, Kayden, Horstemeyer & Risley, LLP

(57) ABSTRACT

A method and system for remotely inspecting the integrity of a structure. This can be performed by a method creating a vibratory response in the structure from a remote location and then measuring the vibratory response of the structure remotely. Alternatively, this can be performed by a system for remotely measuring the integrity of a structure using a vehicle and an artificial neural network, where the vehicle is equipped with a vibratory response device. The vibratory response can be produced by infrasonic and audio frequencies that can be produced by at least a vehicle, motor, or sound recording. The vibratory response can be measured with a laser vibrometer or an audio recording device.

75 Claims, 7 Drawing Sheets

OTHER PUBLICATIONS

Mammone, Richard J. and Zeevi, Yehoshua, *Neural Networks Theory and Applications*. Chapters 1 and 3, pp. 1–22, 43–80 (1991).

Reitman, Ed. *Experiments in Artificial Neural Networks*. Chapter 1, pp. 1–12 (1988).

Dunlop, J.I. "Damping Loss in Wood at Mid Kilohertz Frequencies" Wood and Science Technology, Chapter 12, pp. 49–62 (1978).

Dunlop, J.I. "Testing of Poles by Acoustic Resonance" Wood and Science Technology, Chapter 17, pp. 31–38 (1983).

Klapstein, Weichman, Bauer and Kenway. "Optical characteristics of wood stains and rot" Applied Optics, vol. 28, No. 20, pp. 4450–4452 (Oct. 15, 1989).

\* cited by examiner

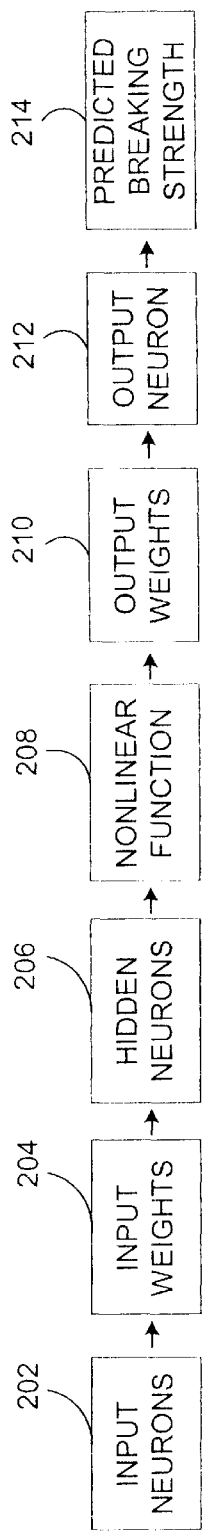
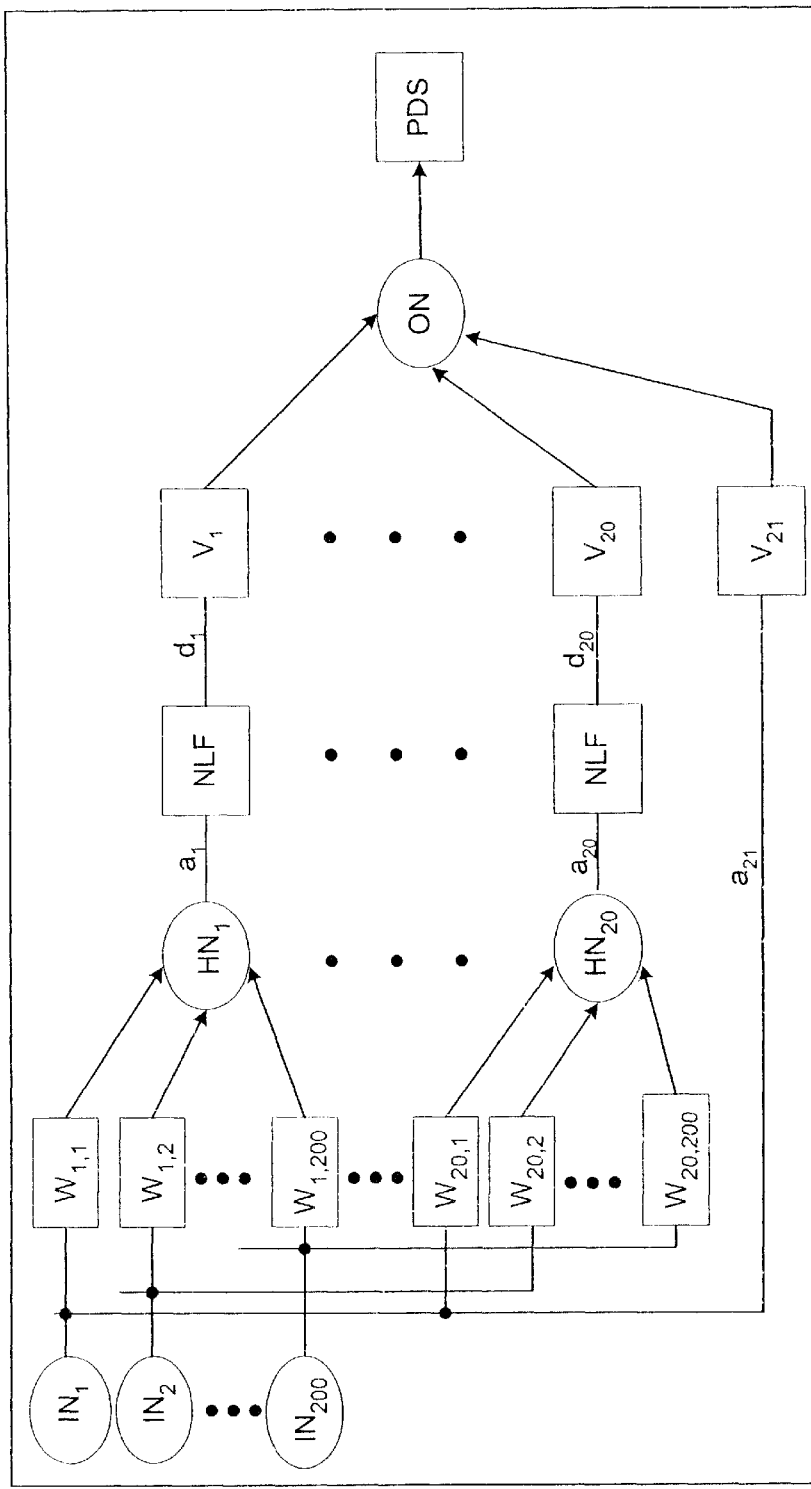

LASER DOPPLER VIBROMETER FOR REMOTE ASSESSMENT OF STRUCTURAL COMPONENTS

CLAIM OF PRIORITY

This application claims priority to U.S. provisional application entitled, "Application of Laser Doppler Vibrometer For Remote Assessment of Structural Components," having Ser. No. 60/133,588, filed May 11, 1999, now abandoned, which is entirely incorporated herein by reference.

TECHNICAL FIELD

The present invention is generally related to non-destructive evaluation of structures and, more particularly, is related to a system and method for remotely measuring the strength integrity of a structure.

BACKGROUND OF THE INVENTION

Electric power transmission lines require regular inspections to ensure safety and reliability. Hazardous, expensive, and time consuming tower climbing inspections are typically used to verify the structural integrity of pole-tops, cross arms, and other elevated components. "Structural integrity" refers generally to its soundness, or, more specifically, to the absence of macro- and microstructural irregularities that are known or suspected to affect the strength of the material. In addition to the aforementioned deficiencies, tower climbing inspections are inconsistent and will vary from inspector to inspector.

Structural integrity can be tested by using destructive or non-destructive techniques. Material testing for quality control continues to be mostly destructive in nature despite efforts to develop non-destructive alternatives that are more feasible in terms of price, convenience and reliability. Although destructive testing is quite often more accurate because the condition of the material is made manifest rather than inferred. The obvious disadvantage is that the material or product tested is destroyed or rendered useless by the testing process. Furthermore, testing integrity by removal of already in-place structures, like cross arms on power lines, is not practical.

Alternatively, structural integrity can be tested using non-destructive techniques. Most non-destructive testing evaluates the material's composition and structure by relying on the interaction of the tested material with sound waves or electromagnetic radiation. Such methods involve monitoring the effect of pressure or electromagnetic waves passing through the material as they are influenced by flaws or inhomogeneities in the test structure. Monitoring the effects is typically done by making contact between the measuring device and the material.

Laser beams are known for use in non-destructive testing to detect structural defects. For example, a laser beam is projected onto a test object, the object is vibrated and the pattern of light reflected from the object is analyzed. As the frequency and intensity of vibrations are varied, changes appear in the pattern of light. Particular changes indicate that defects are present in the object. Non-destructive materials testing systems make use of the relationship between resonant frequency and the structural soundness of materials.

The analysis in most non-destructive testing of this type relies on the relationship between the material's resonant frequency and the strength and quality of the material's structure. The resonant frequency of a material depends upon, among other things, the material's shape, density, stiffness and the like.

Typically, the tested material structure is vibrated using a known force that is in contact with the structure (such as a hammer blow or vibrator exciting a power pole) and the vibrational characteristics of the tested area is measured. The collected data is used to compute the resonant frequency of the tested area. Generally, digital computers are used to perform evaluations based on the resonant frequency using known relationships. However, this method of creating vibration is time consuming and costly.

Acoustic resonance techniques have been used to measure the integrity of wood. Degradation can be determined by examining the acoustical resonance characteristics of wood. If there is an increase in the damping of the longitudinal acoustic waves, then the integrity of the wood has been degraded. However, a vibration generator must be attached to one point on the pole while a sensor is attached at another point on the pole. Performing this for the hundreds of thousands of transmission structures would be an arduous and expensive undertaking.

Another solution was to use the damping loss factor of a material to determine qualitatively the structural integrity of a material. The data analysis was performed using a standard digital analysis technique. As above, an electrodynamic shaker is attached to the pole to cause a vibration, while the vibration is measured with a laser vibrometer. Using this technique to determine structural integrity for the numerous transmission structures located in the United States would also be arduous and expensive.

Thus, there is a need to find an apparatus and method to measure structural integrity safely, remotely, accurately, and in an inexpensive manner.

SUMMARY OF THE INVENTION

This invention is a method and system for remotely inspecting the integrity of a structure. One embodiment of this invention is a method of inspecting the integrity of a structure by creating a vibratory response in the structure from a remote location and then measuring the vibratory response of the structure remotely by an artificial neural network. The vibratory response can be produced by infrasonic and audio frequencies that can be produced by at least a vehicle, motor, or sound recording. The vibratory response can be measured with a laser vibrometer or an audio recording device.

A second embodiment of this invention is a method of evaluating the integrity of a structure by measuring the vibratory response of a structure from a remote location and then evaluating the excitation using an artificial neural network. The artificial neural network can be a feedforward or self organizing map artificial neural network.

A further embodiment of this invention is a method of remotely inspecting the integrity of a structure by creating infrasonic and audio frequencies, which produce vibratory response in the structure. Then the vibratory response is measured and a determination is made by an artificial neural network of whether or not the structure is sound.

Another embodiment of this invention is a system for remotely measuring the integrity of a structure using a vehicle and an artificial neural network, where the vehicle is equipped with a vibratory response device. The vehicle can be an aircraft, automobile or any other appropriate vehicle. The vibratory response can be produced by infrasonic and audio frequencies that can be produced by a vehicle, motor, sound recording or loudspeaker. The vibratory response can be measured with a laser vibrometer or an audio recording device. The artificial neural network can be a feedforward or self-organizing map artificial neural network.

A final embodiment of this invention is a system for remotely measuring the integrity of a structure using vehicle and an artificial neural network, where the vehicle produces an audio frequency.

Other systems, methods, features, and advantages of the present invention will be or become apparent to one with skill in the art upon examination of the following drawings and detailed description. It is intended that all such additional systems, methods, features, and advantages be included within this description, be within the scope of the present invention, and be protected by the accompanying claims.

BRIEF DESCRIPTION OF THE DRAWINGS

The invention can be better understood with reference to the following drawings. The components in the drawings are not necessarily to scale, emphasis instead being placed upon clearly illustrating the principles of the present invention. Moreover, in the drawings, like reference numerals designate corresponding parts throughout the several views.

FIG. 2A and 2B describe a feedforward artificial neural network, where FIG. 2A is a block diagram of how information moves through the feedforward artificial neural network and FIG. 2B describes the topology of the feedforward artificial neural network.

DETAILED DESCRIPTION

Figure 1:
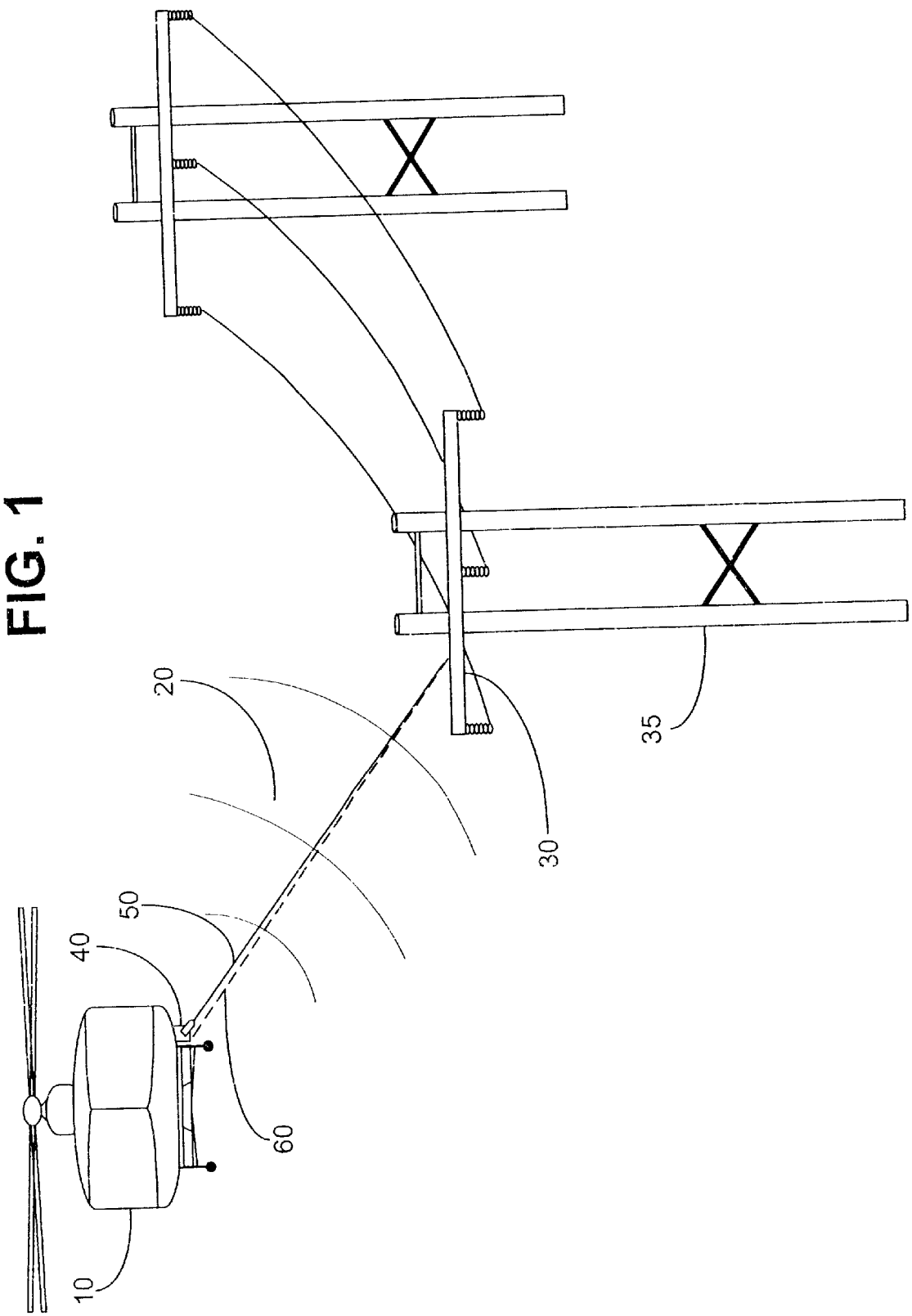
FIG. 1 is a schematic of an aircraft acquiring data from a power pole cross arm.

FIG. 1 depicts one embodiment of this invention, where an aircraft is equipped with a laser vibrometer. A preferred embodiment of this invention opportunistically uses the vibration produced by the aircraft 10 to produce a semi-random, broad-band suite of infrasonic and audio frequencies 20. The cross arm 30 of the transmission structure 35 is vibratorily excited by the infrasonic and audio frequencies 20. Degraded cross arms vibrate differently than structurally sound cross arms. The laser vibrometer 40 emits a laser beam 50 that is aimed at a particular cross bar 30 on a transmission structure 35, while the aircraft 10 passes the transmission structure 35. Laser light 60 that is scattered or reflected by the cross arm 30 is collected by the laser vibrometer 40 and saved as response data. The vibratory response and detection are performed remotely, thus precluding the danger inherent with climbing inspections. The entire process can be performed in less than one second. After the vibratory data is collected, an artificial neural network is used to evaluate the data and distinguish sound cross arms from degraded cross arms. Thus, this invention is a method and system of determining structural integrity of structures safely, remotely, and in an economical manner.

The structures that can be inspected include pole-tops, cross arms, and other elevated components on telephone poles, power poles, radio towers, TV towers, cell/mobile phone towers, bridges, structures in manufacturing supporting vessels, piping, military structures, space structures, or other similar types of structures. This invention can be used to inspect structures where there is a need to inspect the structure from a remote location.

The vibratory response can be produced by a vehicle such as an aircraft, e.g., a helicopter or airplane, or automobile, e.g., a car or truck. In addition, the excitation can be produced by a motor (e.g., such as from a lawn mower), sound recording, or any other appropriate vibratory response device. Under some circumstances, it may be viable to use environmental noise as the source of the vibratory excitation. The vibratory response is caused by infrasonic and audio frequencies, or suite of infrasonic and audio frequencies, produced by a vehicle, motor, sound recording, or other vibratory response device. The infrasonic and audio frequencies can be produced by the vehicle itself, e.g., motor or propeller, or by a sound recording. Preferably, the infrasonic and audio frequencies are produced by the vehicle. Preferably, the infrasonic and audio frequencies are a semi-random, broad-band suite of audio frequencies; however, other appropriate infrasonic and audio frequencies can be used.

Vibrational characteristics are measured by a vibratory response measuring device, preferably a laser vibrometer, but can be measured by any non-contacting device that can measure vibratory response, e.g., a audio recording device such as a microphone.

In a preferred embodiment, a laser vibrometer is used to measure the vibratory response. In practice, a laser vibrometer operates by transmitting laser light to the vibrated structure and collecting laser light scattered or reflected therefrom. The data collected from the vibratory response is termed the vibration data. To increase the reflection of the laser beam a reflective material can be placed onto the cross arm or other structure.

Measuring vibrational velocity using a laser vibrometer is based on the Doppler principal: measurement of a very slight shift in the wavelength of laser light when it is scattered or is reflected from a moving object. Combining the transmitted light with the scattered light causes interference, where the interference is related to the amount of the shift and thus related to the vibrational velocity of the structure on which the laser light is directed.

Preferably, a laser vibrometer is used because laser vibrometers are generally more accurate and convenient than other devices for measuring vibrational velocity, but other methods can be used. The laser vibrometer is especially convenient in that laser light can be transmitted and collected from a remote location, such as an aircraft or moving vehicle.

The vibration data collected from the laser vibrometer or alternative device can be treated in a number of ways. The following is a preferred embodiment of how vibration data can be preprocessed. First, vibration data is collected from the laser vibrometer as Fast Fourier Transform (FFT) data from 0 Hz to 1600 Hz in 4 Hz increments. Data points from 0 Hz–792 Hz (199 samples) are put into a data set. There are N data sets where N is the number of structures measured. Next, the natural logarithm of each data point is taken and when a data point is zero, due to instrument sensitivity, that point is made equal to the average of the samples on either side of the zero value sample. Then, each data set is normalized by dividing every sample datum point by the maximum data point value sampled in that particular spectrum. This normalizes each cross arm's data from 0 to 1. The purpose for this process is to prevent later analysis to be confounded by signal strength, or vibration amplitude. Vibration amplitude is not controlled, and is a function of how close the noise generator (e.g., helicopter) is to the structure. This information says nothing about structural integrity, and so must be normalized among all the data sets. Normalization is performed for each of the N data sets or FFT spectrums (each arm). For training data sets the actual cross arm-breaking force, which corresponds to a particular data set, and becomes the $200^{th}$ datum point. The actual breaking strengths of the cross arms should be normalized from 0 to 1. Next, the data is put into a 200 point row vector. Further, concatenate every row vector into one single N by 200 matrix (file). Lastly, save the N by 200 matrix in a format that can be presented to the artificial neural network (ANN). Data sets where the actual breaking strength is not known only have 199 points in each data set. Thus, the matrix file will only be N by 199.

An ANN will be used to distinguish usable structural members from non-usable members in a digital computer simulation of a biological computing structure. Biological computing is adept at pattern recognition but is a poor method for adding numbers. Any appropriate ANN can be used to analyze data in this invention including feedforward and self-organizing map ANN's.

Biological computing uses analogical or continuously variable input values. Computed decisions based on these values are weighted sums of the inputs. The process is inherently parallel. As a pattern-recognition engine, the ANN has the advantage of being able to interpolate by making educated guess decisions, which are not based on specific prior knowledge. An ANN decision can be based on factors that are unknown, non-linear, or unrecognized. The only requirement is that the neural network must have had experience with appropriate problems of such complexity, i.e. training.

In general, ANNs can be described as a computing architecture that is made of parallel interconnections of neural processors. In other words, ANN is a mathematical model patterned after the biological behavior of neurons, which classify patterns input into the artificial neural network. In order for an ANN to correctly classify input patterns, adjustable weights and thresholds must be appropriately set for each neuron or unit of the ANN. The adjusting process of the weights is commonly referred to as training or learning, which reflects the traditional iterative nature of biological learning processes.

In general, an ANN includes input neurons, output neurons, and hidden neurons. A neuron is simply a data processing device capable of receiving multiple inputs, processing those inputs, and generating one or more outputs based on those inputs. Generally, this means that the input neurons receive a single input, hidden neurons receive several inputs, and output neurons receive several inputs. The hidden neurons do not receive any input signals from sources outside the ANN. Further, they do not output signals to any devices outside the ANN. Consequently, hidden neurons are hidden from the universe existing outside the ANN. However, ANN's can have feed back loops, where there are two layers of hidden neurons and the neuron in the later layer is connected to the neuron in the former layer. One skilled in the art would realize that variations could be made with the structure of the ANN. Two ANN's that can be used in this invention are a feedforward ANN and a self-organizing map ANN.

One embodiment of the ANN is a feedforward ANN (FFANN) as depicted in FIGS. 2A and 2B. Preferably, this FFANN has 199 input neurons (200 input neurons for training sets), one bias input, and 20 hidden neurons. There is only one layer of hidden neurons. The transfer functions are sigmodial nonlinear transfer functions. All input weights are connected to all the hidden neurons. There is only one output neuron.

FIG. 2A is a block diagram showing how information moves through the FFANN. The data set is input into the input neurons $202$ (e.g., $IN_1, IN_2, \ldots IN_{200}$). Typically, the first neuron ($IN_1$,) is programmed to have a bias equal to one. This is necessary to ensure proper operation of the FFANN. However, the FFANN will "learn" if the bias is not needed and the weight corresponding to the bias input will be adjusted to zero by the back-propagation algorithm or similar algorithm. The b $2^{nd}$ through $200^{th}$ input neurons ($IN_2, \ldots IN_{200}$) will have data points 1 through 199 input into them. Then the information is multiplied by their respective input weights 204 (e.g., $W_{1,1}, W_{1,2}, \ldots W_{1,200} \ldots W_{20,1}, W_{20,2} \ldots W_{20,200}$). All 200 input neurons (199 data points and 1 bias point) are multiplied by their respective input weights and are summed at the hidden neurons 206 ($HN_1 \ldots HN_{20}$). In other words, each hidden neuron receives information from 200 properly weighted data points. Each hidden neuron produces a summation result, e.g., $a_1 \ldots a_{20}$, that is passed through a nonlinear transfer function (NLF) 208. Then, each NLF 208 produces a result, e.g., $d_1 \ldots d_{20}$, that is multiplied by the output weights 210, e.g., $V_1 \ldots V_{20}, V_{21}$. The bias point is also multiplied by an output weight 210 ($V_{21}$), but does not pass through a NLF 208 as is shown in FIG. 2B. The output neuron 212 receives the properly weighted values (twenty-one in total) and produces a summation that corresponds to the predicted breaking strength 214 of a particular cross arm. One skilled in the art would understand that variation on the number of hidden neurons and layers of hidden neurons is possible. Additional variations could be envisioned by one skilled in the art.

Figure 3:
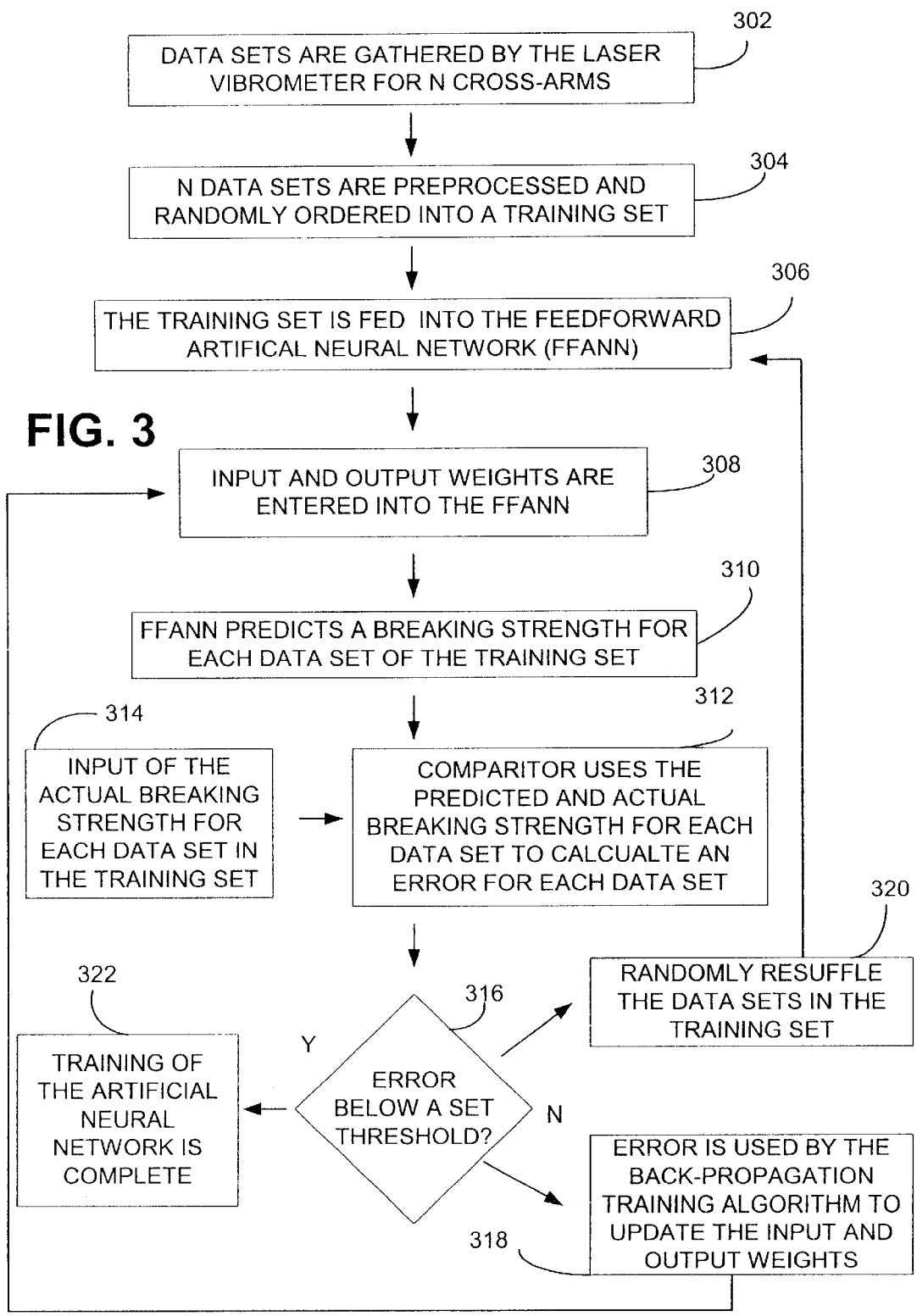
FIG. 3 is a block diagram of the training procedure of a feedforward artificial neural network.

FIG. 3 generally describes the training stage of the FFANN in the present invention. Cross-arm FFT vibration data is gathered by the laser vibrometer 302. Selected arms that have been measured by the laser vibrometer, a quantity N, are then removed from service and broken, and their breaking strengths are measured and stored in 314. The vibration data, plus the breaking strength, form a data-set for each of the N cross arms. These N data-sets are then shuffled into a randomly placed list of strong and weak arms, called the training set. This is done to prevent the FFANN from trying to learn something about the sequence in which the different data-sets are presented to it during training. The vibration data of each arm is preprocessed 304 according to the aforementioned methods, and the training set is fed into the FFANN 306. Initially, the input and output weights 308 of the FFANN are set to random values. The FFANN predicts the breaking strength of each data set of the training set 310. The comparator 312 calculates the difference or error between the predicted and actual known breaking strengths 314. This is performed for each of the data sets in the training set. If the error is below a particular threshold 316 then the training is complete 322. If the error is not below a particular threshold 316 then the data sets in the training set are reshuffled 320 into a new random list. In addition, the back-propagation training algorithm 318 uses the error to update the input and output weights 308. The aforementioned process is then repeated, often many thousands of times, until the error is below a threshold value 316, thereby indicating that training of the FFANN is complete 322.

The back-propagation training algorithm 318 is set to a learning gain equal to 0.05, learning momentum equal to 0.04, training epochs equal to 10,000, linear output, and delta learning rule. Back-propagation training algorithms are well known mathematical procedures and one skilled in the art would understand that the values input into the back-propagation training algorithm are not absolute and other suitable values can be used. In general, ANN's are tolerant of imprecision and various values can be used to obtain the same result, albeit within an acceptable error limit.

Figure 4:
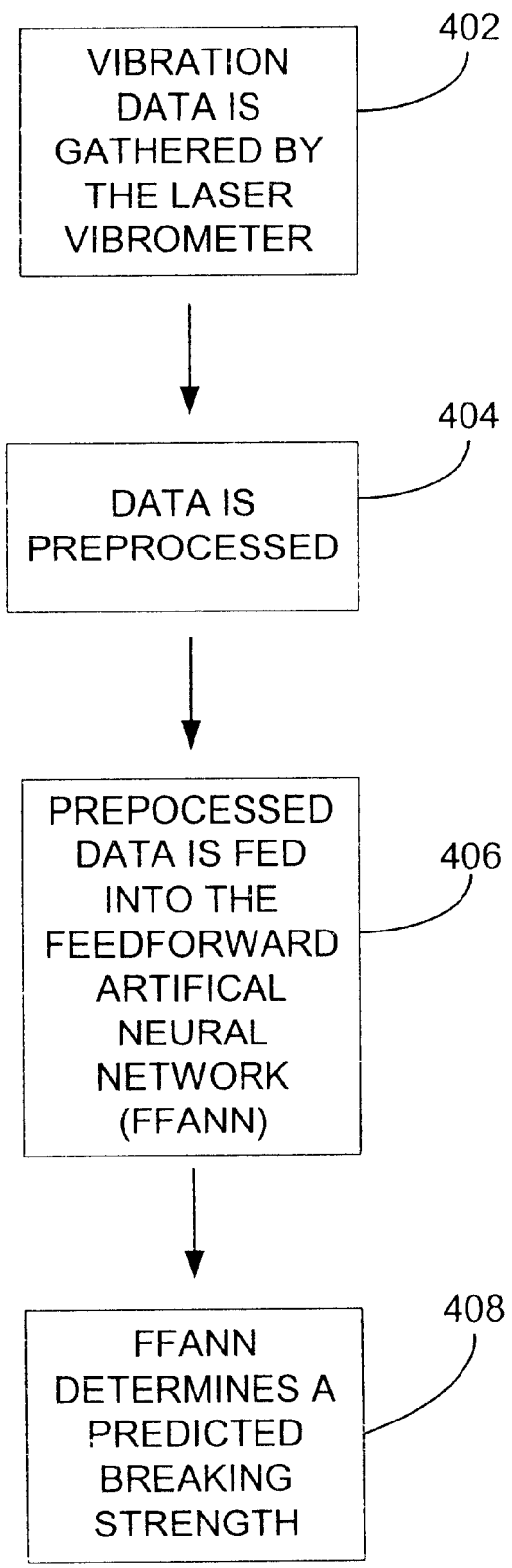
FIG. 4 is a block diagram of the procedure for using this invention.

Once the FFANN has been trained, the system is ready to predict the strength of cross-arms for which breaking strength values are not available, FIG. 4. The FFANN is therefore now able to input vibrational data for a particular cross-arm and predict its breaking strength. First, the cross-arm vibration data is gathered by the laser vibrometer 402. Next, the data is preprocessed 404 according to the methods outlined above. Lastly, the data is fed into the ANN 406, which predicts a breaking strength 308 for the particular cross-arm. The details of how the FFANN operates are discussed above in FIGS. 2A and 2B.

Figure 5:
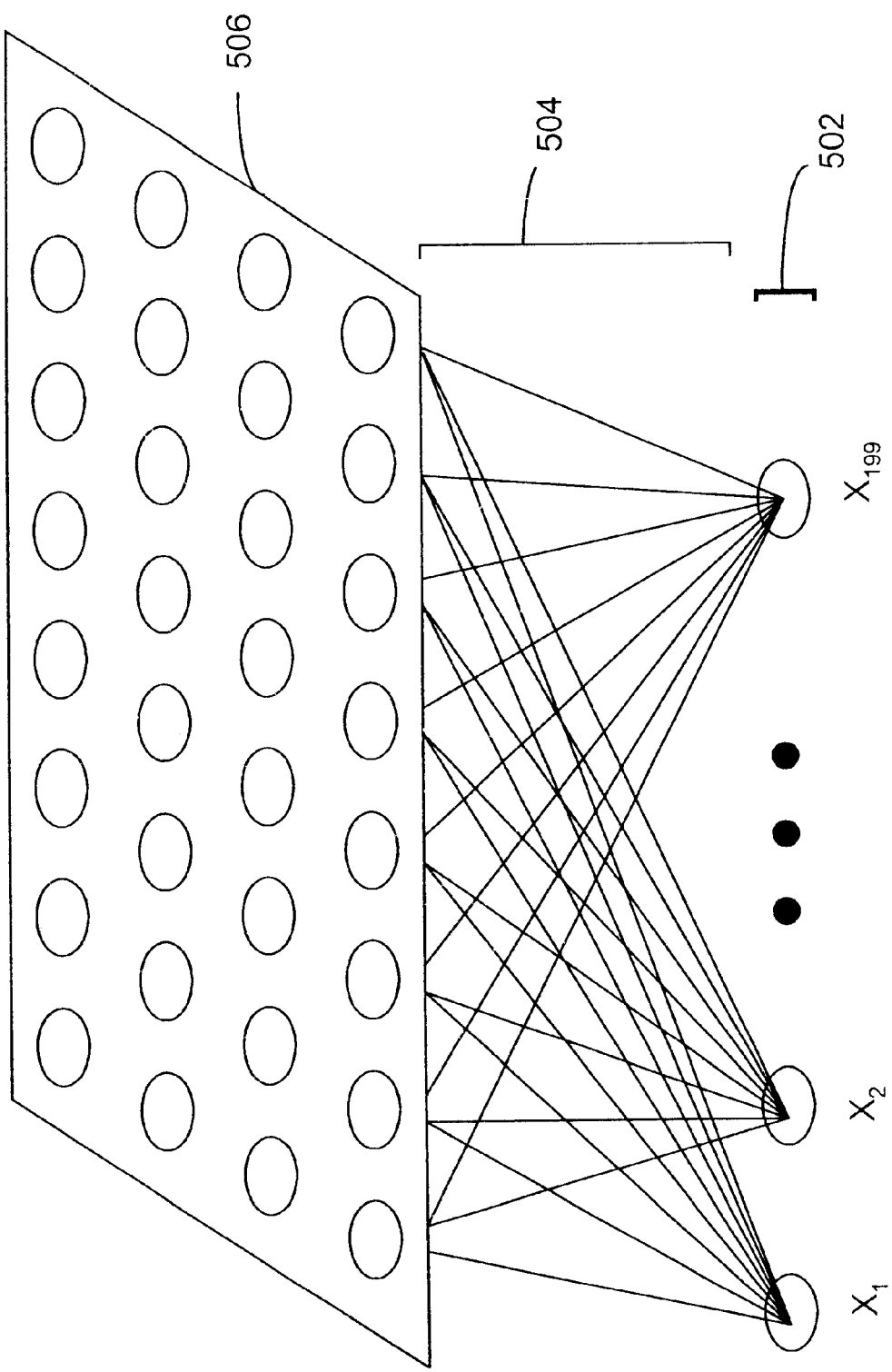
FIG. 5 describes the topology of a self organizing map artificial neural network.

Another embodiment of the ANN for this invention is a self-organizing map ANN (SOMANN) as shown in FIG. 5. Preferably, this SOMANN has 199 input neurons 502 and a 2-dimensional grid or map of output neurons 506. The number of output neurons 506 can vary depending on the resolution or precision needed. Every input neuron 502 is connected to each output neuron 506 via connection weights 504. In other words, every output neuron 506 has 199 connection weights 504 directed towards it from all 199 input neurons 502, which is partially depicted in FIG. 5. However, FIG. 5 does not show the input neurons 502 connected to every output neuron 506 for sake of clarity. One skilled in the art would understand that variations can be made to the structure or topology of the SOMANN and still accomplish the same goal of this invention.

Figure 6:
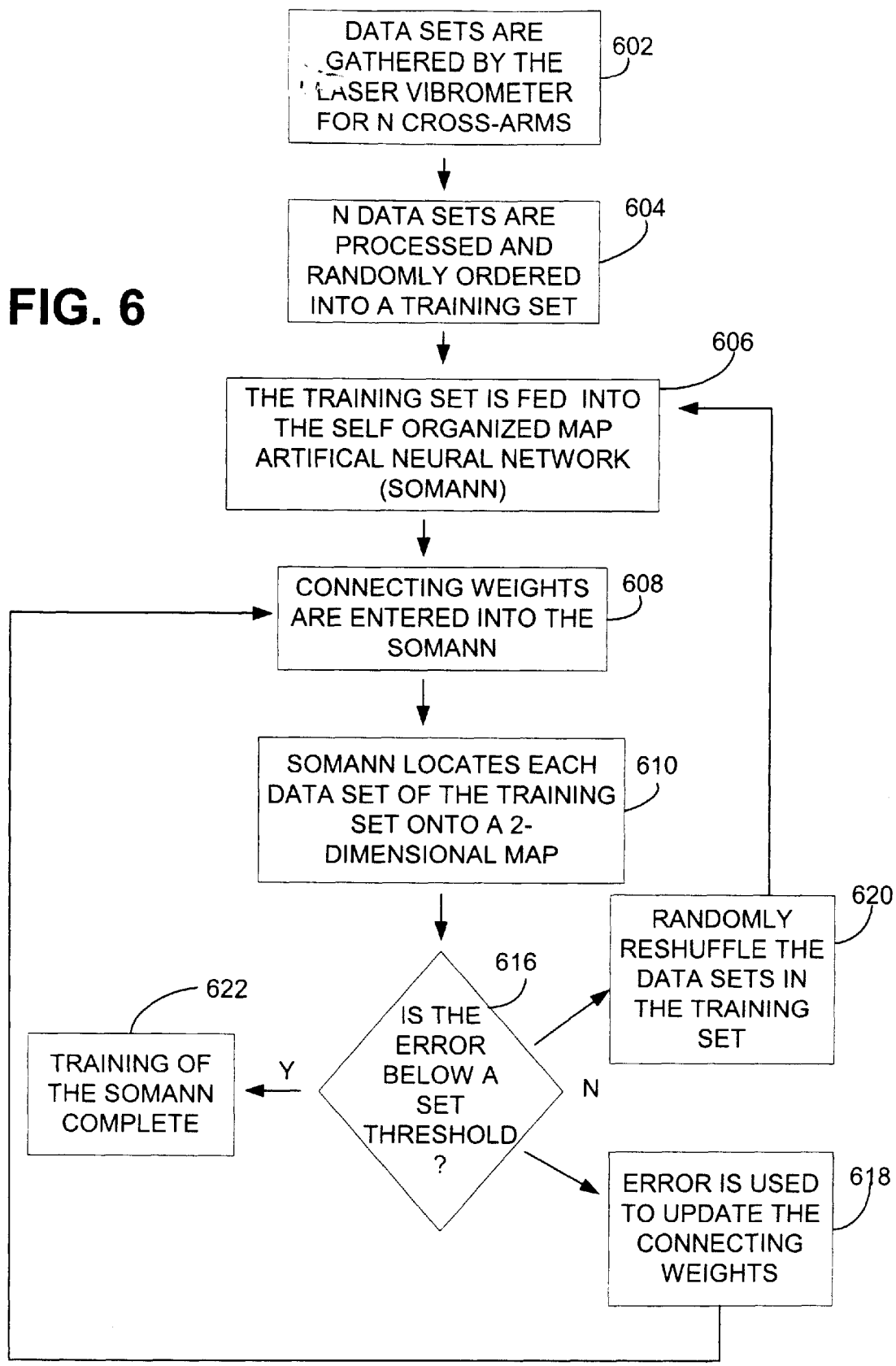
FIG. 6 is a block diagram of the training procedure of a self organizing map artificial neural network.

FIG. 6 generally describes the training process of the SOMANN used in this invention. Cross-arm FFT vibration data is gathered by the laser vibrometer 602 for N cross arms. The breaking strengths of the cross arms are not needed to train the SOMANN, but are used after training to designate areas of the 2-dimensional map as "strong," "average," and "weak," discussed in more detail below. The vibration data form a data set for each of the N cross arms. These N data-sets are then shuffled into a randomly placed list of cross arms, called the training set. This is done to prevent the SOMANN from trying to learn something about the sequence in which the different data-sets are presented to it during training. The vibration data of each arm is processed 604 and the training set is fed into the SOMANN 606. Initially, the connecting weights 608 of the SOMANN are set to random values. The SOMANN locates each data set onto the 2-dimensional map 610. The SOMANN analyzes the statistical properties of the weighted input information and locates each data set, or cross arm, onto the 2-dimensional map. More particularly, for each output neuron, the input vector, i.e. input neurons, is multiplied by the corresponding connecting weights to produce a number called an activation threshold. After this process is performed for each output neuron, the output neuron with the highest activation threshold "wins", i.e. "winner take all" algorithm. Then a comparison is made or error determined between the values of the input vector and the corresponding connecting weights 616. If the error is below a particular threshold then the training of the SOMANN is complete 622. However, if the error is not below the particular threshold then the data sets are reshuffled into a new random list 620 and resubmitted into the SOMANN 606 to continue training. In addition, the error is used to update the connecting weights 218. The aforementioned process is then repeated, often many thousands of times, until the error is below a threshold value 616, thereby indicating that training of the SOMANN is complete 622.

An alternative to the "winner take all algorithm" is the "Kohonen algorithm." This algorithm operates by updating the connecting weights in some area or neighborhood around the winning output neuron. One skilled in the art would understand that alternative algorithms to the winner take all and Kohonen algorithms can be successfully used in this invention.

The SOMANN produces a 2-dimensional map after training, where particular cross arms are put onto various areas of the map. Thus, by determining the actual breaking strengths of the cross arms used in the training sets, a correlation can be made between the area of the 2-dimensional map and the actual breaking strength. Areas of the 2-dimensional map can be characterized as "strong," "average," and "weak." Other more specific classifications can be made if necessary. The final result is a 2-dimensional map that has areas designated as strong, average, or weak.

Figure 7:
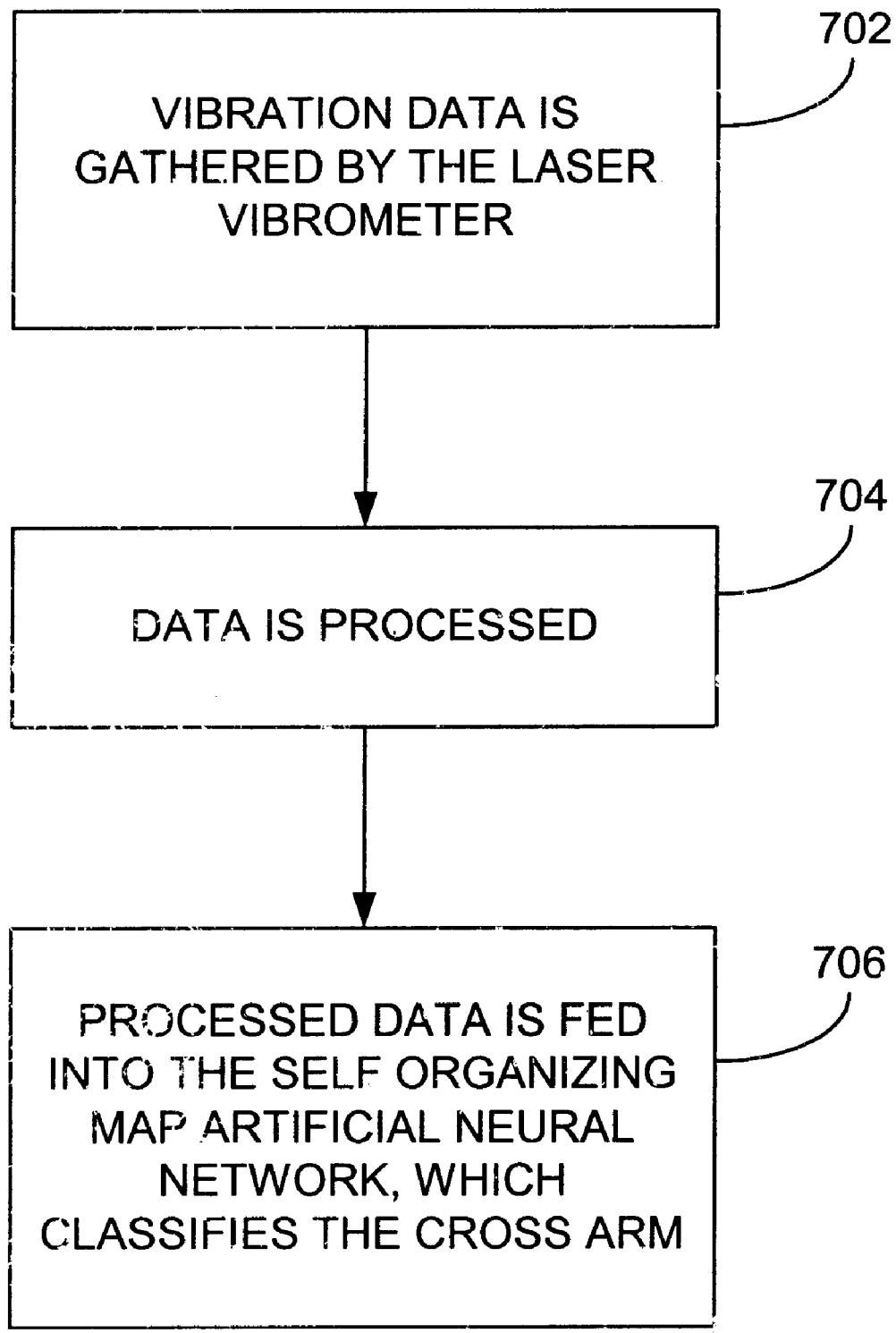
FIG. 7 is a block diagram of the procedure for using this invention.

Once the SOMANN has been trained, the system is ready to predict the strength of cross-arms for which breaking strength values are not available, FIG. 7. The SOMANN is therefore now able to input vibrational data for a particular cross-arm. First, the cross-arm vibration data is gathered by the laser vibrometer 702. Next, the data is processed 704. Lastly, the data is fed into the SOMANN 706, which classifies the cross arm. The classes correspond to a place on the 2-dimensional map obtained through training that correspond to a strong, average, or weak cross arm. For example, the upper right hand portion of the 2-dimensional map is characterized as strong. Then while analyzing a particular cross arm, the result of the SOMANN is that the cross arm is located in the upper right hand corner of the 2-dimensional map. Thus, the cross arm would be considered strong. The details of how the SOMANN operates are discussed above in FIG. 5.

The FFANN and SOMANN of the present invention can be implemented in hardware, software, firmware, or a combination thereof. In the preferred embodiment(s), the ANN is implemented in software or firmware that is stored in a memory and that is executed by a suitable instruction execution system. If implemented in hardware, as in an alternative embodiment, the ANN can be implemented with any or a combination of the following technologies, which are all well known in the art: a discrete logic circuit(s) having logic gates for implementing logic functions upon data signals, an application specific integrated circuit (ASIC) having appropriate combinational logic gates, a programmable gate array(s) (PGA), a field programmable gate array (FPGA), etc.

It should be emphasized that the above-described embodiments of the present invention, particularly, any "preferred" embodiments, are merely possible examples of implementations, are merely set forth for a clear understanding of the principles of the invention. Many variations and modifications may be made to the above-described embodiment(s) of the invention without departing substantially from the spirit and principles of the invention. All such modifications and variations are intended to be included herein within the scope of this disclosure and the present invention and protected by the following claims.

What is claimed is:

1. A method of inspecting the integrity of a structure comprising:

creating a vibratory response in said structure remotely, wherein said vibratory response is measured as vibration data; and measuring the vibratory response remotely, wherein said vibration data is preprocessed in a way including:

collecting said laser vibrometer vibration data as Fast Fourier Transform data in 4 hertz increments from 0 hertz to 1300 hertz for N data sets, where said N data sets corresponds to the number of said structures measured, and broken and used for training;

dividing the frequency range into 4 hertz increments from 0 hertz to 792 hertz producing 199 data points for each data set;

taking the natural logarithm of said 199 data points of each data set;

normalizing said 199 data points by dividing said 199 data points by the largest data point value of that particular data set for each data set;

transforming said 199 data points of each data set into a 199 point row vector;

concatenating said row vectors into one single N by 199 matrix; and saving said matrix in a format suitable to present to the artificial neural network.

2. The method of claim 1, wherein said vibratory response is produced by a suite of infrasonic and audio frequencies.

3. The method of claim 2, wherein said infrasonic and audio frequencies are produced by a vehicle.

4. The method of claim 2, wherein said infrasonic and audio frequencies are produced by a motor.

5. The method of claim 2, wherein said infrasonic and audio frequencies are produced by a sound recording.

6. The method of claim 1, wherein said vibratory response is measured with a laser vibrometer.

7. The method of claim 1, wherein said vibratory response is measured with an audio recording device.

8. The method of claim 1, wherein said vibration data is evaluated with an artificial neural network.

9. The method of claim 8, wherein said artificial neural network is a feed-forward artificial neural network.

10. The method of claim 8, wherein said artificial neural network is a self-organizing map artificial neural network.

11. The method of claim 1, wherein said structure comprises a power pole cross-arm.

12. The method of claim 1, wherein the said structure can be coated with a reflecting material.

13. A method for evaluating the integrity of a structure comprising:

measuring vibratory response in said structure remotely, wherein said vibratory response is measured as vibration data; and evaluating said excitation with an artificial neural network, wherein said vibration data is preprocessed in a way including:

collecting said laser vibrometer vibration data as Fast Fourier Transform data in 4 hertz increments from 0 hertz to 1300 hertz for N data sets, where said N data sets corresponds to the number of said structures measured, and broken and used for training;

dividing the frequency range into 4 hertz increments from 0 hertz to 792 hertz producing 199 data points for each data set;

taking the natural logarithm of said 199 data points of each data set;

normalizing said 199 data points by dividing said 199 data points by the largest data point value of that particular data set for each data set;

transforming said 199 data points of each data set into a 199 point row vector;

concatenating said row vectors into one single N by 199 matrix; and saving said matrix in a format suitable to present to the artificial neural network.

14. The method of claim 13, wherein said vibratory response is measured with a laser vibrometer.

15. The method of claim 13, wherein said vibratory response is measured with an audio recording device.

16. The method of claim 13, wherein said artificial neural network is a feed-forward artificial neural network.

17. The method of claim 13, wherein said artificial neural network is a self-organizing map.

18. The method of claim 13, wherein said structure comprises a power pole cross-arm.

19. The method of claim 13, wherein the said structure can be coated with a reflecting material.

20. A method of remotely inspecting the integrity of a structure comprising:

creating infrasonic and audio frequencies;

producing a vibratory response in said structure using said frequencies, wherein said vibratory response is measured as vibration data;

measuring said vibratory excitation; and determining said structural integrity using an artificial neural network, wherein said vibration data is preprocessed in a way including:

collecting said laser vibrometer vibration data as Fast Fourier Transform data in 4 hertz increments from 0 hertz to 1300 hertz for N data sets, where said N data sets corresponds to the number of said structures measured;

dividing the frequency range into 4 hertz increments from 0 hertz to 792 hertz producing 199 data points for each data set;

taking the natural logarithm of said 199 data points of each data set;

normalizing said 199 data points by dividing said 199 data points by the largest data point value of that particular data set for each data set;

transforming said 199 data points of each data set into a 199 point row vector;

concatenating said row vectors into one single N by 199 matrix; and saving said matrix in a format suitable to present to the artificial neural network.

21. The method of claim 20, wherein said infrasonic and audio frequencies are a semirandom, broad-band suite of audio frequencies.

22. The method of claim 20, wherein creating infrasonic and audio frequencies comprises:

creating infrasonic and audio frequencies with a vehicle.

23. The method of claim 20, wherein creating infrasonic and audio frequencies comprises:

creating infrasonic and audio frequencies with a motor.

24. The method of claim 20, wherein creating infrasonic and audio frequencies comprises:

creating infrasonic and audio frequencies with playing a sound recording of infrasonic and audio frequencies.

25. The method of claim 20, wherein said vibratory response is measured with a laser vibrometer.

26. The method of claim 20, wherein said vibratory response is measured with an audio recording device.

27. The method of claim 20, wherein said artificial neural network is a feed-forward artificial neural network.

28. The method of claim 20, wherein said artificial neural network is a self-organizing map artificial neural network.

29. The method of claim 20, wherein said structure comprises a power pole cross-arm.

30. The method of claim 20, wherein the said structure can be coated with a reflecting material.

31. A system for remotely measuring the integrity of a structure comprising:
  a vehicle, wherein said vehicle comprises a vibratory response measuring device; and
  a neural network.

32. The system of claim 31, wherein said vehicle comprises an aircraft.

33. The system of claim 31, wherein said vehicle comprises an automobile.

34. The system of claim 31, wherein said structure is vibratorily excited by an audio frequency.

35. The system of claim 31, wherein said audio frequency is produced by said vehicle.

36. The system of claim 31, wherein said audio frequency is produced by a motor.

37. The system of claim 31, wherein said audio frequency is produced from a sound recording.

38. The system of claim 31, wherein said infrasonic and audio frequency comprises a semi-random, broad-band suite of audio frequencies.

39. The system of claim 31, wherein said vibratory measuring device is a laser vibrometer.

40. The system of claim 31, wherein said vibratory measuring device is an audio recording device.

41. The system of claim 31, wherein said vibratory response is measured as vibration data.

42. The system of claim 41, wherein said vibration data is preprocessed in a way comprising:
  collecting said laser vibrometer vibration data as Fast Fourier Transform data in 4 hertz increments from 0 hertz to 1300 hertz for N data sets, where said N data sets corresponds to the number of said structures measured, and broken and used for training;
  dividing the frequency range into 4 hertz increments from 0 hertz to 792 hertz producing 199 data points for each data set;
  taking the natural logarithm of said 199 data points of each data set;
  normalizing said 199 data points by dividing said 199 data points by the largest data point value of that particular data set for each data set;
  transforming said 199 data points of each data set into a 199 point row vector;
  concatenating said row vectors into one single N by 199 matrix; and
  saving said matrix in a format suitable to present to the artificial network.

43. The system of claim 42, wherein said data set comprises 200 data points, where the $200^{th}$ data point is the actual breaking strength of said structure.

44. The system of claim 31, wherein said artificial neural network is a feed-forward artificial neural network.

45. The system of claim 31, wherein said artificial neural network is a self-organizing map artificial neural network.

46. A system for remotely measuring the integrity of a structure comprising:
  a vehicle, wherein said vehicle produces an audio frequency that causes a vibratory response in said structure and wherein said vehicle comprises a vibratory response measuring device; and
  a neural network, wherein said neural network evaluates said vibratory excitation.

47. The system of claim 46, wherein said vehicle comprises an aircraft.

48. The system of claim 46, wherein said vehicle comprises an automobile.

49. The system of claim 46, wherein said audio frequency comprises a semi-random, broad-band suite of audio frequencies.

50. The system of claim 46, wherein said vibratory measuring device is a laser vibrometer.

51. The system of claim 46, wherein said vibratory measuring device is an audio recording device.

52. The system of claim 46, wherein said vibratory response is measured as vibration data.

53. The method of claim 52, wherein said vibration data is preprocessed in a way comprising:
  collecting said laser vibrometer vibration data as Fast Fourier Transform data in 4 hertz increments from 0 hertz to 1300 hertz for N data sets, where said N data sets corresponds to the number of said structures measured, and broken and used for training; dividing the frequency range into 4 hertz increments from 0 hertz to 792 hertz producing 199 data points for each data set;
  taking the natural logarithm of said 199 data points of each data set;
  normalizing said 199 data points by dividing said 199 data points by the largest data point value of that particular data set for each data set;
  transforming said 199 data points of each data set into a 199 point row vector;
  concatenating said row vectors into one single N by 199 matrix; and
  saving said matrix in a format suitable to present to the artificial neural network.

54. The method of claim 53, wherein said data set comprises 200 data points, where the $200^{th}$ data point is the actual breaking strength of said structure.

55. The system of claim 53, wherein said artificial neural network is a feed-forward artificial neural network.

56. The system of claim 53, wherein said artificial neural network is a self-organizing map artificial neural network.

57. A method of inspecting the integrity of a structure comprising:
  creating a vibratory response in said structure remotely, wherein said vibratory response is measured as vibration data including 200 data points, where the $200^{th}$ data point is the actual breaking strength of said structure; and
  measuring the vibratory response remotely.

58. The method of claim 57, wherein said vibratory response is produced by a suite of infrasonic and audio frequencies.

59. The method of claim 58, wherein said infrasonic and audio frequencies are produced by a vehicle.

60. The method of claim 58, wherein said infrasonic and audio frequencies are produced by a motor.

61. The method of claim 58, wherein said infrasonic and audio frequencies are produced by a sound recording.

62. The method of claim 57, wherein said vibratory response is measured with a laser vibrometer.

63. The method of claim 57, wherein said vibratory response is measured with an audio recording device.

64. A method for evaluating the integrity of a structure comprising:

measuring vibratory response in said structure remotely, wherein said vibratory response is measured as vibration data including 200 data points, where the $200^{th}$ data point is the actual breaking strength of said structure; and evaluating said excitation with an artificial neural network.

65. The method of claim 64, wherein said artificial neural network is a feed-forward artificial neural network.

66. The method of claim 64, wherein said artificial neural network is a self-organizing map.

67. The method of claim 64, wherein said structure comprises a power pole cross-arm.

68. The method of claim 64, wherein the said structure can be coated with a reflecting material.

69. A method of remotely inspecting the integrity of a structure comprising:

creating infrasonic and audio frequencies;

producing a vibratory response in said structure using said frequencies, wherein said vibratory response is measured as vibration data including 200 data points, where the $200^{th}$ data point is the actual breaking strength of said structure;

measuring said vibratory excitation; and determining said structural integrity using an artificial neural network.

70. The method of claim 69, wherein said infrasonic and audio frequencies are a semi-random, broad-band suite of audio frequencies.

71. The method of claim 69, wherein creating infrasonic and audio frequencies comprises:

creating infrasonic and audio frequencies with a vehicle.

72. The method of claim 69, wherein creating infrasonic and audio frequencies comprises:

creating infrasonic and audio frequencies with a motor.

73. The method of claim 69, wherein creating infrasonic and audio frequencies comprises:

creating infrasonic and audio frequencies with playing a sound recording of infrasonic and audio frequencies.

74. The method of claim 69, wherein said vibratory response is measured with a laser vibrometer.

75. The method of claim 69, wherein said vibratory response is measured with an audio recording device.

* * * * *

UNITED STATES PATENT AND TRADEMARK OFFICE
CERTIFICATE OF CORRECTION

PATENT NO. : 6,505,130 B1
DATED : January 7, 2003
INVENTOR(S) : Springer, III et al.

It is certified that error appears in the above-identified patent and that said Letters Patent is hereby corrected as shown below:

Column 4,
Line 26, replace "a" with -- an --.

Column 5,
Line 9, delete "and".

Column 9,
Line 15, in claim 1 after "hertz" insert -- ; -- and re-format the claim to read as follows:

1. A method of inspecting the integrity of a structure comprising:
   creating a vibratory response in said structure remotely, wherein said vibratory response is measured as vibration data; and
   measuring the vibratory response remotely, wherein said vibration data is preprocessed in a way including:
      collecting said laser vibrometer vibration data as Fast Fourier Transform data in 4 hertz increments from 0 hertz to 1600 hertz for N data sets, where said N data sets corresponds to the number of said structures measured, and broken and used for training;
      dividing the frequency range into 4 hertz increments from 0 hertz to 792 hertz;
      producing 199 data points for each data set;
      taking the natural logarithm of said 199 data points of each data set;
      normalizing said 199 data points by dividing said 199 data points by the largest data point value of that particular data set for each data set;
      transforming said 199 data points of each data set into a 199 point row vector;
      concatenating said row vectors into one single N by 199 matrix; and
      saving said matrix in a format suitable to present to the artificial neural network.

UNITED STATES PATENT AND TRADEMARK OFFICE
CERTIFICATE OF CORRECTION

PATENT NO. : 6,505,130 B1
DATED : January 7, 2003
INVENTOR(S) : Springer, III et al.

It is certified that error appears in the above-identified patent and that said Letters Patent is hereby corrected as shown below:

Column 9,
Line 64, in claim 13 after "hertz" insert -- ; -- and re-format the claim to read as follows:

13. A method for evaluating the integrity of a structure comprising:
    measuring vibratory response in said structure remotely, wherein said vibratory response is measured as vibration data; and
    evaluating said excitation with an artificial neural network, wherein said vibration data is preprocessed in a way including:
        collecting said laser vibrometer vibration data as Fast Fourier Transform data in 4 hertz increments from 0 hertz to 1600 hertz for N data sets, where said N data sets corresponds to the number of said structures measured, and broken and used for training;
        dividing the frequency range into 4 hertz increments from 0 hertz to 792 hertz;
        producing 199 data points for each data set;
        taking the natural logarithm of said 199 data points of each data set;
        normalizing said 199 data points by dividing said 199 data points by the largest data point value of that particular data set for each data set;
        transforming said 199 data points of each data set into a 199 point row vector;
        concatenating said row vectors into one single N by 199 matrix; and
        saving said matrix in a format suitable to present to the artificial neural network.

Column 10,
Line 39, in claim 20 after "hertz" insert -- ; -- and re-format the claim to read as follows:

20. A method of remotely inspecting the integrity of a structure comprising:
    creating infrasonic and audio frequencies;
    producing a vibratory response in said structure using said frequencies, wherein said vibratory response is measured as vibration data;
    measuring said vibratory excitation; and

UNITED STATES PATENT AND TRADEMARK OFFICE
CERTIFICATE OF CORRECTION

PATENT NO.    : 6,505,130 B1
DATED         : January 7, 2003
INVENTOR(S)   : Springer, III et al.

It is certified that error appears in the above-identified patent and that said Letters Patent is hereby corrected as shown below:

<u>Column 10, line 39, claim 20 cont'd,</u> determining said structural integrity using an artificial neural network, wherein said vibration data is preprocessed in a way including:

collecting said laser vibrometer vibration data as Fast Fourier Transform data in 4 hertz increments from 0 hertz to 1600 hertz for N data sets, where said N data sets corresponds to the number of said structures measured;

dividing the frequency range into 4 hertz increments from 0 hertz to 792 hertz;

producing 199 data points for each data set;

taking the natural logarithm of said 199 data points of each data set;

normalizing said 199 data points by dividing said 199 data points by the largest data point value of that particular data set for each data set;

transforming said 199 data points of each data set into a 199 point row vector;

concatenating said row vectors into one single N by 199 matrix; and saving said matrix in a format suitable to present to the artificial neural network.

<u>Column 11,</u>
Line 43, in claim 42 after "hertz" insert -- ; -- and re-format the claim to read as follows:

42. The system of claim 41, wherein said vibration data is preprocessed in a way comprising:

collecting said laser vibrometer vibration data as Fast Fourier Transform data in 4 hertz increments from 0 hertz to 1600 hertz for N data sets, where said N data sets corresponds to the number of said structures measured, and broken and used for training;

dividing the frequency range into 4 hertz increments from 0 hertz to 792 hertz;

producing 199 data points for each data set;

taking the natural logarithm of said 199 data points of each data set;

normalizing said 199 data points by dividing said 199 data points by the largest data point value of that particular data set for each data set;

transforming said 199 data points of each data set into a 199 point row vector;

concatenating said row vectors into one single N by 199 matrix; and saving said matrix in a format suitable to present to the artificial network.

UNITED STATES PATENT AND TRADEMARK OFFICE
CERTIFICATE OF CORRECTION

PATENT NO.    : 6,505,130 B1
DATED         : January 7, 2003
INVENTOR(S)   : Springer, III et al.

It is certified that error appears in the above-identified patent and that said Letters Patent is hereby corrected as shown below:

Column 12,
Line 24, in claim 53 after "hertz" insert -- ; -- and re-format the claim to read as follows:

53. The method of claim 52, wherein said vibration data is preprocessed in a way comprising:

collecting said laser vibrometer vibration data as Fast Fourier Transform data in 4 hertz increments from 0 hertz to 1600 hertz for N data sets, where said N data sets corresponds to the number of said structures measured, and broken and used for training;

dividing the frequency range into 4 hertz increments from 0 hertz to 792 hertz;

producing 199 data points for each data set;

taking the natural logarithm of said 199 data points of each data set;

normalizing said 199 data points by dividing said 199 data points by the largest data point value of that particular data set for each data set;

transforming said 199 data points of each data set into a 199 point row vector;

concatenating said row vectors into one single N by 199 matrix; and saving said matrix in a format suitable to present to the artificial neural network.

Signed and Sealed this

Twenty-fourth Day of June, 2003

JAMES E. ROGAN
*Director of the United States Patent and Trademark Office*

UNITED STATES PATENT AND TRADEMARK OFFICE
CERTIFICATE OF CORRECTION

PATENT NO.    : 6,505,130 B1
DATED         : January 7, 2003
INVENTOR(S)   : Springer, III et al.

It is certified that error appears in the above-identified patent and that said Letters Patent is hereby corrected as shown below:

<u>Title page,</u>
Item [75], Inventors, name replace "James E. Mahaffey" with
-- James A. Mahaffey --

Signed and Sealed this

Second Day of December, 2003

JAMES E. ROGAN
*Director of the United States Patent and Trademark Office*